United States Patent [19]
Ayres

[11] 3,872,729
[45] Mar. 25, 1975

[54] CONSTRICTIONLESS THERMOMETER PROVIDED WITH ADHESIVE

[75] Inventor: Waldemar A. Ayres, Rutherford, N.J.

[73] Assignee: Becton, Dickinson and Company, East Rutherford, N.J.

[22] Filed: Feb. 27, 1974

[21] Appl. No.: 446,378

[52] U.S. Cl. .................................................. 73/371
[51] Int. Cl. ............................................... G01k 5/22
[58] Field of Search .......... 73/371, 373, 368, 368.2, 73/368.4, 425 AP; 138/37, 40, 145, 146

[56] References Cited
UNITED STATES PATENTS
3,487,693  1/1970  Weinstein ............................ 73/371
3,783,696  1/1974  Coleman ........................ 138/146 X FOREIGN PATENTS OR APPLICATIONS
1,144,506  2/1963  Germany ............................. 73/368

Primary Examiner—Charles A. Ruehl
Attorney, Agent, or Firm—Kane, Dalsimer, Kane, Sullivan and Kurucz

[57] ABSTRACT

A clinical thermometer is provided wherein the constriction of the conventional thermometer is eliminated and the thermometer capillary is coated with an adhesive to retain the maximum reading.

4 Claims, 2 Drawing Figures

PATENTED MAR 25 1975                    3,872,729

CONSTRICTIONLESS THERMOMETER PROVIDED WITH ADHESIVE

BACKGROUND OF THE INVENTION

The present invention relates to thermometers and in particular to a maximum reading thermometer in which the constriction of a conventional thermometer is eliminated.

In the conventional mercury thermometer, a constriction is located in the thermometer tube between the bulb and capillary. Upon warming of the bulb, the mercury expands through the constriction to a point along the capillary corresponding to the temperature attained. Upon subsequent cooling, the mercury in the capillary remains at the maximum level attained until subsequently "shaken down."

The relatively high cost of conventional mercury clinical thermometers is due primarily to three factors: the cost of the materials (particularly mercury), the highly skilled labor and manufacturing techniques required to produce the constriction in the thermometer bore, and the costs of calibration and testing.

In view of the above, it is the principal object of the present invention to provide a thermometer which can be quantity produced at less cost than the conventional thermometer by eliminating the constriction.

SUMMARY OF THE INVENTION

The above and other beneficial objects and advantages are attained in accordance with the present invention by providing a thermometer wherein the constriction of the conventional thermometer is eliminated and the thermometer capillary is coated with an adhesive to retain the maximum reading.

DETAILED DESCRIPTION OF THE PREFERRED EMBODIMENT

Figure 1:
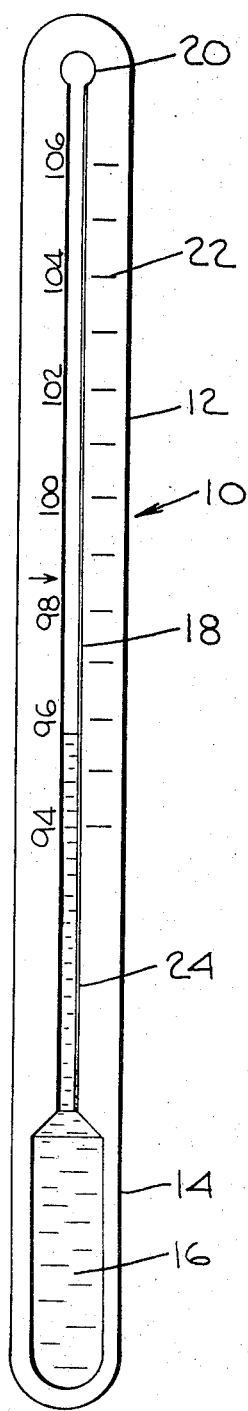
FIG. 1 is a simplified diagrammatic sectional view of a thermometer in accordance with the present invention and FIG. 2 is an exploded sectional view of the lower portion of the coated capillary bore and the upper portion of the bulb.
Figure 2:
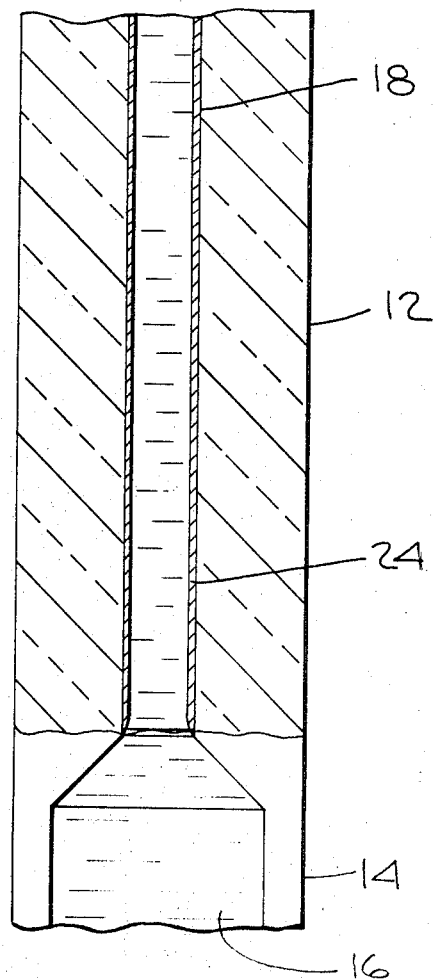

Reference is now made to the drawing wherein a thermometer 10 embodying the invention is illustrated. The thermometer comprises a tube 12 formed of glass or the like provided with a bulb 14 at one end thereof. The bulb comprises a reservoir for an expansible liquid 16 such as mercury. A capillary 18 extends from the bulb toward the opposite end of the thermometer. The capillary is capped with an upper chamber 20 to reduce the chances of bursting the thermometer in the event of overheating during shipment or storage.

A scale 22 extends along the tube adjacent portions of the capillary. For most clinical purposes the scale extends between 94° and 106°F, or the Centigrade equivalent.

In the conventional mercury thermometer, the capillary 18 connects with the reservoir 14 through a constriction. In accordance with the present invention, a section of the bore of capillary 18 is coated with an adhesive 24 having an affinity for the expansible liquid. For example, the sticky pressure sensitive adhesives found on conventional cellophane tape, surgical tape and electrician's plastic tape were found to have an affinity for mercury. Such an adhesive may conveniently be dissolved in solvent and then deposited on the capillary bore. The molecular attraction between the adhesive and the very small cross section of mercury in the capillary bore will hold the mercury at its maximum reading until "shaken down" or centrifuged in the usual manner.

The adhesive is deposited in so thin a layer as to be transparent, so that the column of temperature indicating material is readily seen through the adhesive coating. Alternatively, the adhesive selected may be translucent or transparent by nature in much greater thickness than used to coat the capillary bore.

Thus, in accordance with the above, the aforementioned objects are effectively attained. Although only one embodiment of my invention has been disclosed, it should be understood that the scope of the invention is not limited to the disclosed embodiment but rather should be measured by the following claims.

Having thus described the invention, what is claimed is:

1. In a thermometer of the type comprising a thermometer bulb, an expansible liquid in said bulb, and a capillary extending from the bulb, with said expansible fluid flowing from the bulb into the capillary during warming of the thermometer, the improvement comprising: at least a portion of the capillary having a coating of adhesive material, said material having an affinity for said liquid.

2. The invention in accordance with claim 1, wherein said adhesive maintains a sticky surface.

3. The invention in accordance with claim 1, wherein said adhesive is soluble in a solvent.

4. The invention in accordance with claim 1, wherein said adhesive is sufficiently transparent so that the maximum temperature of a patient is readily seen through the adhesive coating of the thermometer capillary.

* * * * *